May 6, 1947. A. R. ADAMS 2,420,060
FASTENER
Filed May 28, 1945
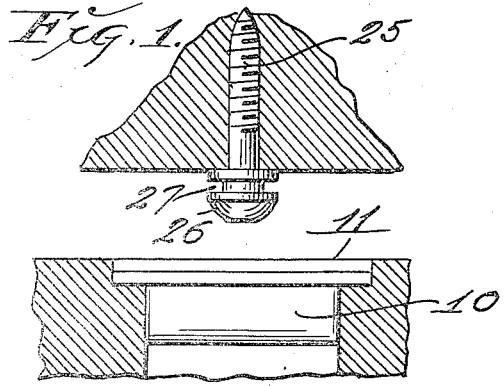
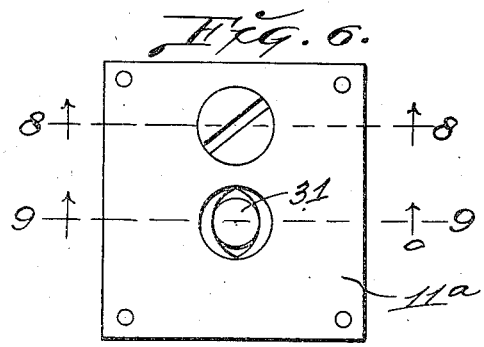
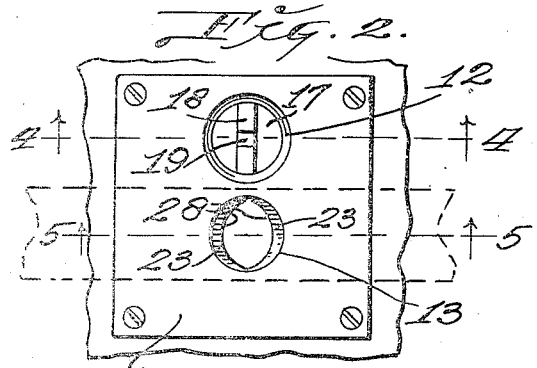
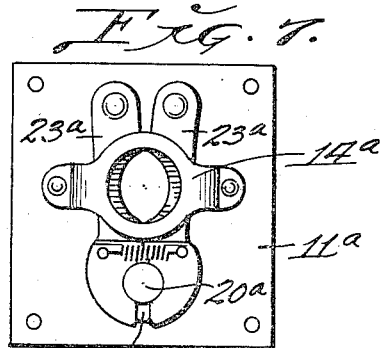
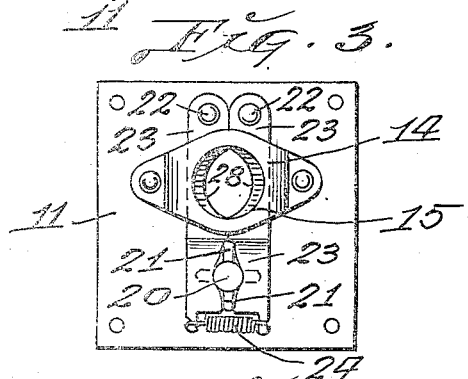
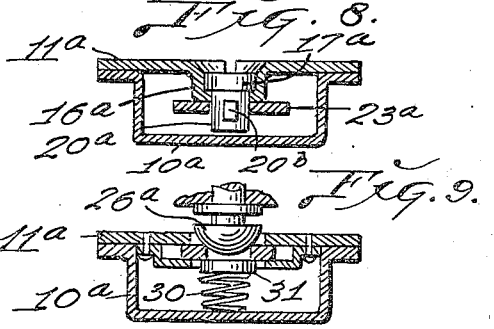
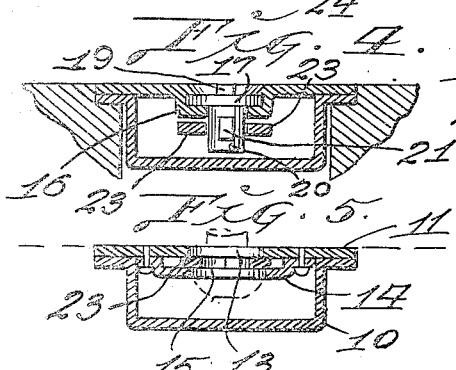
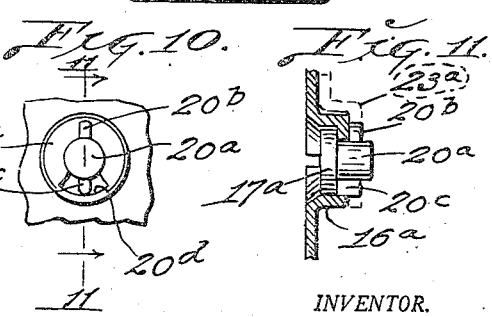
INVENTOR.
ARTHUR R. ADAMS.
By Marvin P. Smith
ATTY.

Patented May 6, 1947

2,420,060

UNITED STATES PATENT OFFICE 2,420,060

FASTENER

Arthur R. Adams, Glendale, Calif.

Application May 28, 1945, Serial No. 596,229

9 Claims. (Cl. 85—5)

1

My invention relates generally to connecting and fastening means, and more particularly, though not exclusively, to a quick acting, readily releasable fastener which may be advantageously employed for detachably securing chairs, tables and other pieces of furniture to the floor, also for detachably connecting parts of buildings, such as walls, floors, partitions, panels and the like, also large knock down structures such as boxes, cabinets and shelving, for cargo tie-downs and for the suspension of heavy pictures and the like.

The principal objects of my invention are, to generally improve upon and simplify the existing forms of quick acting readily releasable connecting and fastening devices and to provide a fastener of simple, compact, durable structure, wherein one member includes a pair of spring held jaws, adapted to receive and securely hold an inserted stud or headed member and which two members are carried respectively, by the structural parts or elements which are to be detachably connected.

Further objects of my invention are to provide simple and easily operated means for releasing the parts of the fastener and to provide means for expelling or "kicking" the engaged head or stud from the gripping means when the latter is released.

With the foregoing and other objects in view, my invention consists in certain novel features of construction and arrangement of parts which will be hereinafter more fully described and claimed and illustrated in the accompanying drawings in which:

Fig. 1 is an elevational view of the two parts of the fastener mounted in structural parts or elements which are to be connected and fastened.

Fig. 2 is a plan view of the housing member of the fastener.

Fig. 3 is a view looking against the underface of the cover plate of the housing.

Fig. 4 is a cross section taken on the line 4—4 of Fig. 2.

Fig. 5 is a cross section taken on the line 5—5 of Fig. 2.

Fig. 6 is a plan view of a modified form of the housing member.

Fig. 7 is a view looking against the underface of the cover plate of the form of housing seen in Fig. 6.

Fig. 8 is a cross section taken on the line 8—8 of Fig. 6.

Fig. 9 is a cross section taken on the line 9—9 of Fig. 6.

Fig. 10 is a fragmentary plan view of a portion

2 of the jaw releasing means in the modified form of the fastener.

Fig. 11 is a vertical section taken on the line 11—11 of Fig. 10.

Referring by numerals to the accompanying drawings, particularly Figs. 1 to 5 inclusive, 10 designates a shallow box-like housing, the top of which is closed by a readily removable cover plate 11 and formed in the central portion of the latter, are apertures 12 and 13.

Suitably secured to the underside of plate 11 are the ends of a keeper strap 14, the intermediate portion of which is spaced a slight distance apart from the cover plate, said keeper extending across aperture 13 and being provided with an aperture 15, which coincided with said aperture 13.

Secured to the underside of plate 11 around the aperture 12, is a bearing 16 for a rotary disc 17 that is positioned beneath said aperture and formed on top of said disc within the aperture 12, is a rib 18 in which is formed a notch 19 adapted to receive the point of a screwdriver or like tool.

Depending from disc 17 through bearing 16 is a stud 20, and projecting from diametrically opposite points thereon, are lugs 21. Pivoted at 22 to the underface of plate 11 are jaws or latching fingers 23 which extend beneath aperture 13 between plate 11 and keeper 14 and the ends of said jaws opposite the pivoted ends are shaped so as to lie beneath bearing 16.

The ends of the jaws 23 beyond the bearing 16 are connected by a retractile spring 24, and the inner edges of said jaws beneath the bearing are notched for the accommodation of stud 20 and lugs 21.

When the jaws 23 are closed, lugs 21 occupy positions parallel with said jaws (see Fig. 3).

As seen in Fig. 1 the member which is engaged by the jaws may be a threaded shank 25 seated in one of the structural parts or elements to be connected and said shank provided on its outer end and a head or stud 26, having a rounded outer face and an annular groove 27 for the reception of jaws 23.

The inner edges of jaws 23 between openings 13 and 15 are notched as designated by 28 in order to permit the passage of stud 26 between said jaws.

To connect the parts which carry the housing and stud, the latter is passed through aperture 13, between the notched edges of jaws 23, thereby swinging said jaws apart against the resistance of spring 24 and through aperture 15 in keeper 14, whereupon the notched edges of said jaws snap into groove 27 in the stud, thus securely connecting the assembled parts.

To disconnect the parts, the point of a screwdriver or like tool is engaged in notch 19 in rib 18 and disc 17 and stud 20 are rotated approximately 90° thereby moving lugs 21 into positions at right angles to jaws 23, thus spreading same apart, and withdrawing notched edges 28 of said jaws from groove 27 in the stud, thus enabling the latter to be withdrawn from the jaws and the housing.

The modified structure illustrated in Figs. 6 to 11 includes a housing 10a, cover plate 11a, spring held jaws 23a, a keeper 14a, all practically identical with the corresponding parts above described.

In this construction, a disc 17a is arranged for rotation in a bearing 16a with a stud 20a projecting through the bottom of said bearing.

Projecting from stud 20a outside bearing 16a, is a lug 20b positioned between the jaws 23a and a diametrically opposite lug 20c on said stud projects from disc 17a through an arcuate slot 20d in the bottom of bearing 16a and the outer portion of this last mentioned lug occupies a position between the free end portions of jaws 23a (see Figs. 7 and 11).

The length of slot 20d is such as to limit the travel of lug 20c to about 45°, which is sufficient to separate jaws 23a, the distance required to release the engaged stud and after the disc 17a and stud 20a have been rotated by a suitable tool and the latter is withdrawn from the slot in the disc the latter with stud 20a and lugs 20b will, under pressure of the jaws, rotate back to their normal positions (see Fig. 10).

Suitably secured to the bottom of the housing 10a is the lower end of an expansive coil spring 30, the upper end of which carries a disc 31. This disc normally occupies a position in the opening in the keeper just below the jaws 23a and when the stud 26a passes downward between the jaws, said disc is engaged and moved downward thus compressing and storing power in spring 30.

When disc 17a is rotated to disconnect the parts, spring 30 will act through disc 31 to engage and "kick" the stud 26a out from between the jaws and out of housing 10a.

Thus it will be seen that I have provided a quick acting readily releasable fastener which is simple in structure, inexpensive of manufacture and very effective in performing the functions for which it is intended.

It will be understood that minor changes in the size, form and construction of the various parts of my improved fastener may be made and substituted for herein shown and described without departing from the spirit of the invention, the scope of which is set forth in the appended claims.

I claim as my invention:

1. In a fastener, a cover plate having a pair of openings, a pair of spring held jaws pivoted on the under side of said cover plate and extending across corresponding sides of said openings, a locking member adapted to enter one of said openings and to be engaged by said jaws, rotary means mounted for operation below the other one of said openings for spreading said jaws apart to release said locking member and means underlying the opening adapted to receive the locking member for expelling the locking member from said cover plate when released from said jaws.

2. In a fastener, a cover plate having a pair of openings, one of which is adapted to receive a locking member, a pair of jaws pivoted on the under side of said cover plate and extending across the sides of the opening which is adapted to receive a locking member, a spring associated with said jaws for resisting spreading movements thereof, rotary means mounted in the other of said openings near the free ends of said jaws for spreading said jaws apart, a locking member adapted to be inserted through that one of the openings in said cover plate across which said jaws pass, which locking member is provided with a groove for the reception of the inner edges of said jaws, and means for expelling the locking member from said cover plate when released from said jaws.

3. In a fastener, a cover plate having an opening substantially centrally thereof adapted to receive a locking member, a pair of jaws pivoted on the under side of said cover plate and extending across the sides of the central opening, a spring associated with said jaws for resisting spreading movements thereof, and rotary means mounted in the cover plate near a marginal edge thereof and near the free ends of said jaws for spreading said jaws apart, said rotary means having an operating head accessible on the outer face of said plate for actuation when the central aperture is engaged by a locking member.

4. A fastener comprising a plate having a substantially centrally disposed opening designed to receive a locking member, a pair of latching jaw levers of the second class pivotally connected at one of their ends to one side of said plate remote from said opening and having intermediate portions extending across the sides of said opening to present restricted latching portions adapted for locking engagement with a locking member inserted therein, spring means connecting said jaws remote from their pivoted ends, and release means rotatably mounted in said plate beyond the opening and remote from the pivoted jaw lever ends and provided with radially extending portions disposed between the free ends of said jaw levers for spreading said jaws apart, said release means having an operating head flush with and accessible on the side of said plate opposite the pivoted jaw levers.

5. In a fastener, a cover plate having an opening which is adapted to receive a locking member, a pair of jaws pivoted to the under side of said cover plate and extending across the sides of said opening, a spring associated with said jaws for resisting spreading movements thereof, means mounted on said cover plate near the free ends of said jaws for spreading said jaws apart, a locking member adapted to be inserted in said opening in said cover plate and means for expelling said locking member from said cover plate when said locking member is released from said jaws.

6. A fastener comprising a plate having a substantially disposed opening designed to receive a locking member, a pair of latching jaw levers of the second class pivotally connected at one of their ends to one side of said plate remote from said opening and having intermediate portions extending across the sides of said opening to present restricted latching portions adapted for locking engagement with a locking member inserted therein, spring means connecting said jaws remote from their pivoted ends, and means rotatably mounted in said plate adjacent the free ends of said jaw levers, said means having diametrically opposed blade-like extensions disposed between the terminal ends of jaw levers and adapted upon actuation to separate said jaw levers to release said locking member, said rotary means being provided with actuating means for imparting rotary movement thereto and lying wholly within the plane of the plate.

7. A fastener comprising a plate having a substantially centrally disposed opening designed to receive a locking member, a pair of latching jaw levers of the second class pivotally connected at one of their ends to one side of said plate remote from said opening and having intermediate portions extending across the sides of said opening to present restricted latching portions adapted for locking engagement with a locking member inserted therein, spring means connecting said jaws remote from their pivoted ends, release means rotatably mounted in said plate beyond the opening and remote from the pivoted jaw lever ends and provided with radially extending portions disposed between the free ends of said jaw levers for spreading said jaws apart, said release means having an operating head flush with and accessible on the side of said plate opposite the pivoted jaw levers, and a locking member ejecting spring underlying said central plate aperture and latching portions and adapted to be tensioned by a locking member locked thereby for expelling the locking member when disengaged by the spreading jaw levers as a result of partial rotation of said release means.

8. A fastener comprising a cover plate provided with an opening adapted to receive a locking member, a pair of jaws pivoted to the under side of said plate and extending across the sides of said opening, a bridge member underlying said jaws and provided with an opening adapted to receive the end of a locking member engaged in said plate opening, and means rotatably mounted in said plate for engaging and spreading the jaws to release the locking member.

9. A fastener comprising a plate provided with an opening adapted to receive a locking member, a latching member mounted on one face of said plate and presenting juxtaposed spring tensioned jaws extending across opposite sides of said aperture, and rotary means mounted in and supported by said plate for effecting a spreading of said jaws, said rotary means comprising a headed stud rotatably mounted in an aperture in said plate and radially disposed lugs on said stud extended between the free ends of said jaws, the head of the stud being disposed within the plate.

ARTHUR R. ADAMS.

REFERENCES CITED

The following references are of record in the file of this patent:

UNITED STATES PATENTS

| Number | Name | Date |
| --- | --- | --- |
| 1,652,575 | McGinley | Dec. 13, 1927 |

FOREIGN PATENTS

| Number | Country | Date |
| --- | --- | --- |
| 733,858 | French | July 18, 1932 |